United States Patent [19]
Dirr

[11] Patent Number: 6,072,829
[45] Date of Patent: *Jun. 6, 2000

[54] METHOD OF HIGHER VALUE STEP ENCODING

[76] Inventor: Josef Dirr, Neufahrner Strasse 5, 81679 Munich, Germany

[ * ] Notice: This patent is subject to a terminal disclaimer.

[21] Appl. No.: 08/921,889

[22] Filed: Aug. 25, 1997

[30] Foreign Application Priority Data

Feb. 19, 1997 [DE] Germany ............................ 197 06 411

[51] Int. Cl.$^7$ ...................................... H03K 7/04
[52] U.S. Cl. ...................... 375/239; 358/261.1; 341/109; 341/179; 375/279
[58] Field of Search .................................... 375/239, 308, 375/279, 286; 332/103, 112; 370/212, 213; 341/53, 56, 57, 68, 70, 682, 109, 178, 179; 358/261.1, 261.2, 262.1

[56] References Cited

U.S. PATENT DOCUMENTS 3,847,732 11/1974 Perreault ............................... 358/261.1
5,050,188 9/1991 Dirr .
5,581,368 12/1996 Dirr ........................................ 358/426
5,587,797 12/1996 Dirr ...................................... 358/261.1
5,675,609 10/1997 Johnson ................................. 375/237

FOREIGN PATENT DOCUMENTS 0 197 529 10/1986 European Pat. Off. .
34 39 676 5/1986 Germany .
36 30 117 4/1988 Germany .
197 07 290 9/1997 Germany .

*Primary Examiner*—Stephen Chin
*Assistant Examiner*—Lenny Jiang
*Attorney, Agent, or Firm*—Nields, Lemack & Dingman

[57] ABSTRACT

To achieve economy of a transmission path with good quality of transmission and low expenditure compared to previous codes such as 4PSK–64PSK, the invention provides higher-value pulse duration encoding, such that there is provided only an alternating current of a frequency and phase position, with code elements of different pulse durations which are encoded by a different number of periods or half-periods. The following duration pulse is marked by an amplitude change.

6 Claims, 1 Drawing Sheet

METHOD OF HIGHER VALUE STEP ENCODING

FIELD OF THE INVENTION

The present invention concerns higher-value encoding of information, more particularly for example for the transmission thereof by way of line paths and radio link paths and by way of light waveguides or optical fibers.

BACKGROUND OF THE INVENTION

Higher-value or higher-grade encoding procedures are already known, for example amplitude shift keying (referred to as ASK), frequency shift keying (referred to as FSK) and phase shift keying (referred to as PSK). In most cases the procedure adopted is PSK which is least susceptible to interference or a combination of ASK and PSK in the form of quadrature amplitude modulation (referred to as QAM). The 4PSK-procedure is primarily used, because of the low level of expenditure involved. In order to obtain the four phase steps two alternating currents of the same frequency, phase-shifted through 90°, are respectively shifted through 180°. Here too the expenditure is still very considerable.

SUMMARY OF THE INVENTION

An object of the present invention is to provide a method of step encoding which permits fault-free transmission and which can be implemented with less hardware than hitherto.

Another object of the present invention is to provide a step encoding method which can enhance the economy of a transmission path by increasing the amount of transmissible information.

Still another object of the present invention is to provide a step encoding method affording a high level of transmission quality at viable cost.

In accordance with the principles of the present invention the foregoing and other objects are achieved by a method of step encoding wherein the steps are represented by pulse durations of different magnitudes, wherein associated with said durations are half-periods or periods of an alternating current of identical frequency and phase position.

In that procedure the steps can be represented by a respective fixed numerical value or by a difference numerical value or a negative and positive difference numerical value or a reference numerical value. Marking of the respective following pulse is effected by an amplitude change. The encoding alternating current can also be provided directly as a transmission alternating current. As each code word can have a different number of half-periods or periods, in the event of synchronous transmission with the tappings filling code words are required in accordance with the tapping codings. It is also possible to provide storage or memory means at the transmitting and receiving ends. It is then also possible for example for a filling code word to be inserted in the time between the coded transmission and the line end. Transmission is then effected in each case displaced by one line. If still more information is to be transmitted with only one alternating current at a respective frequency, the steps must be encoded on two alternating currents of identical frequency, which are phase-shifted through 90°. Those alternating currents are then added for the transmission (QAM).

In accordance with a preferred feature of the invention the steps are represented by a number of periods, or a number of half-periods.

In a further preferred form of the method according to the invention the steps are represented by the difference in relation to a reference value, for example four periods, and the reference value itself.

Another preferred form of the method of the invention provides that the steps are represented by the positive and negative difference relative to a reference value and the reference value itself.

A still further preferred method of the invention provides that to multiply the steps there are two encoding alternating currents of identical frequency, which are phase-shifted through 90° relative to each other and which are added for the transmission.

The encoding alternating current may be provided at the same time as a transmission alternating current.

In another preferred feature of the invention, the method of the invention provides that said encoding is used in relation to television insofar as a code-multiplex encoding is formed from all signals in dependence on the value and tapping sequence, wherein the code words of lower value and the tapping sequence can also be distributed to a plurality of code-multiplex code words.

Indirect or direct synchronous transmission of information with the tappings may be effected by a procedure whereby the difference between the sum of the half-waves or periods of the code word, up to the following synchronous identification, for example a PAM-tapping, is also represented as a code word.

Another preferred feature of the invention provides that in addition to the amplitude step for pulse marking there are one or more amplitude steps, in such a way that they directly or indirectly mark by way of the sum or difference of amplitude steps, with incorporation of the pulse marking amplitude step, the change in significant or identification conditions.

The step number may be so selected that there is an increased redundancy combination so that such code elements can be provided that the period number thereof is close together.

Further objects, features and advantages of the present invention will be apparent from the following description of preferred embodiments of the invention.

DESCRIPTION OF PREFERRED EMBODIMENTS

Figure 1:
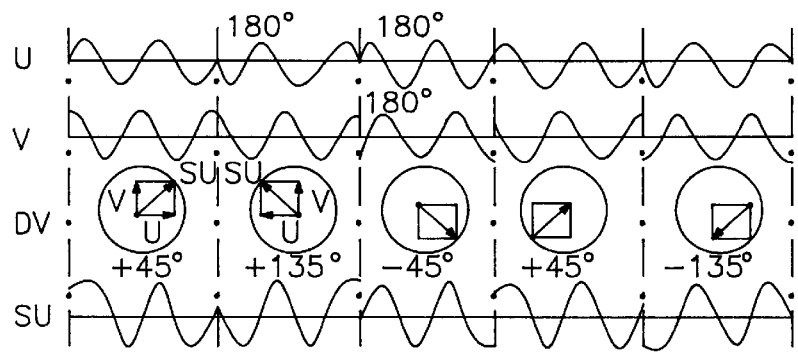
FIG. 1 illustrates the principle of 4PSK.

For comparison purposes, reference is firstly made to FIG. 1 which illustrates the principle of 4PSK. Encoding is effected with the four phase steps +45°, +135°, −45° and −135°. They are produced with two alternating currents indicated at u and v, which are phase-shifted relative to each other through 90°, more specifically by virtue of 180° shifts. Reference DV indicates the vector diagram in that respect. As the amplitudes of the two alternating currents u and v are the same, addition of the two alternating currents gives the step phase position with an always identical amplitude in respect of the sum alternating current as indicated as SU. It will be seen therefrom that the production of those phase steps is nonetheless very complicated and accordingly costly. The transient or build-up effect after each keying shift, in conjunction with the line properties, can result in evaluation or assessment errors.

Figure 2:
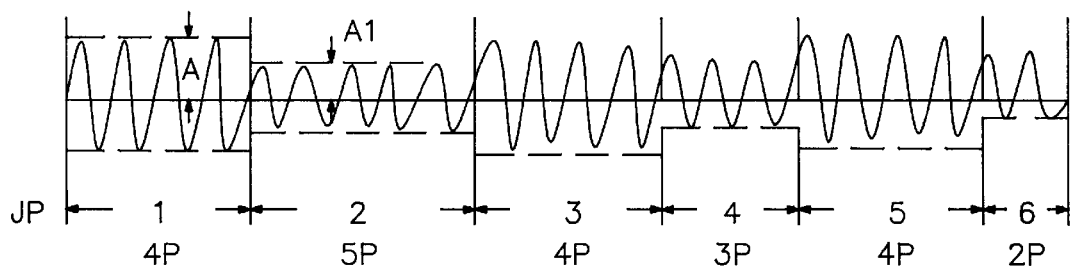
FIG. 2 shows encoding steps represented by pulse durations and periods of an alternating current.
Figure 3:
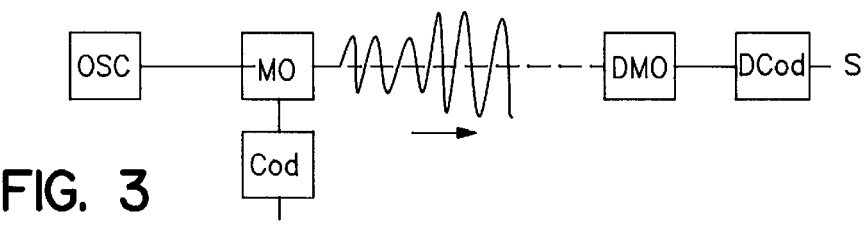
FIG. 3 shows a block circuit diagram for transmission and reception in accordance with the invention.

Reference will now be made to FIG. 2 showing the basic principle of the present invention. The coding steps are characterised by pulse durations indicated at JP 1, 2, 3, 4 . . . of different magnitudes. In that respect each pulse duration has associated therewith a predetermined number of half-periods or periods of an alternating current of the same frequency and phase position. In FIG. 3 there are four steps with two, three, four and five periods.

Each following code element is marked by an amplitude change indicated at A and A1 in FIG. 2. The configuration shown in FIG. 2 could be considered for example as a code word with four steps affording two, three, four, five and six places JP1 through 6. The encoding alternating current can also be used directly as a transmission alternating current.

The steps can be valued or rated differently. In the example shown in FIG. 2 this involves the number of periods as 2, 3, 4 and 5. It is also possible for example to involve the difference in relation to a number of reference periods or also the negative or positive difference in relation to a number of reference periods or half-periods.

Referring now to FIG. 3, shown therein is a block circuit diagram in which the encoding alternating current is used at the same time as a transmission alternating current. That current is produced in the oscillator Osc. The information S is fed to the encoder Cod and encoded. The transmission alternating current from the oscillator Osc is modulated with that code in the modulator diagrammatically indicated at Mo. The encoding alternating current is put on to the transmission path by the modulator. At the receiver the encoding alternating current is demodulated in the demodulator diagrammatically indicated at DMo and passed to the decoder DCod. After decoding the information S can be delivered again at same.

It will be noted at this point that the invention can be used in a very wide range of situations in regard to information transmission, in the transmission of data, in digital speech and audio transmission or in digital television transmission.

An example in regard to use thereof in relation to color television signal encoding and transmission is set out hereinafter.

Figure 4:
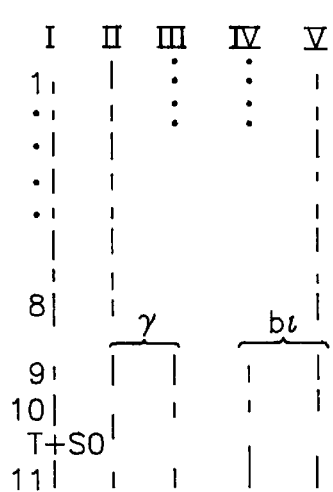
FIG. 4 shows code-multiplex encoding of television signals.

The luminance signal tappings are encoded with 8 bits, the colors red and blue are each encoded with 6 bits and sound and the other signals are encoded with 3 bits. That is illustrated in FIG. 4 by means of a code-multiplex encoding procedure. References I, II, III, IV, V, . . . are the luminance tappings. Red and blue are also tapped off at III. They are encoded and stored. The same occurs with the sound and other signals. In the illustrated example the binary elements of red are distributed to II+III and those of blue to IV/V. The audio and other signals are applied to the luminance tapping I, as they occur. In that case 11 bits are to be encoded for each respective luminance tapping. A pulse duration period code is used. The steps used are four, five, six, seven and eight periods, 11 bits correspond to 2048 combinations while 3125 combinations are obtained with five steps with five places. The redundancy combinations do not have any harmful effect as they are provided for complex combinations, for example 8888 and so forth. In the case of a 5 MHz tapping frequency for the luminance signal and a period requirement of 5×6=30 periods on average for a code word, that gives a transmission frequency of 30×5=150 MHz. Line-wise storage can be involved at the transmission and reception ends. The periods that are not required for each line will then be used with a filling code word.

Figure 5:
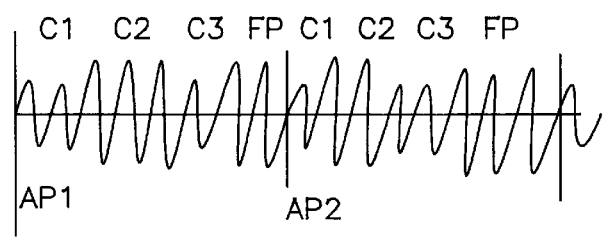
FIG. 5 shows an arrangement of filling code words.

Direct transmission can also be effected synchronously with the tappings. The tapping of the color signals is then already required with the luminance tapping I or II. As the time of a tapping corresponds to thirty periods, the code words will be such that fewer than thirty periods are necessary for each tapping so that there are always some periods left for a filling code word. Storage of the respective useful code word is then required at the receiver. The tapping values are then passed to the picture tube, lagging in terms of time by one tapping. In FIG. 5 C1, C2 and C3 is a three-place code word, FP denotes the filling code word and AP1, AP2, . . . are the tapping spacings.

The transmission frequency can also be reduced if the procedure involves using as the encoding alternating currents two currents which are phase-shifted through 90° and which are added for the transmission. If for example three steps from an encoding alternating current are combined with three steps of the other encoding alternating current, that gives a total of nine steps.

This QAM-method involves a synchronous alternating current, by means of which the two encoding alternating currents can be separated again at the receiving end. For that purpose it is also possible to provide the phase position of one of the two encoding alternating currents, insofar as it is transmitted in a transmission gap, for example at the burst in relation to color television. The QAM-procedure will be more especially used in relation to lower frequencies.

As already mentioned above it is also desirable to produce a high level of redundancy by a higher number of steps and/or places. The useful signal combination can be so selected that the period numbers are close together. It is also possible to provide one or more amplitude steps, in addition to the duration pulse steps. Such an encoding procedure is to be found in German patent No 43 26 997 to which reference may therefore be directed for incorporation of the content thereof in this specification.

It will be appreciated that the above-described preferred procedures in accordance with the invention have been set forth solely by way of example and illustration of the principles of the invention and that various other modifications and alterations may be made therein without thereby departing from the spirit and scope of the invention.

What is claimed is:

1. A method for higher value step encoding wherein the encoding utilizes the duration of pulses which are marked by an alternating current of identical frequency and which pulses are sent in uninterrupted sequence forming an encoding alternating current, wherein said pulses are distinguished from each other by an amplitude change being performed at zero crossing, said method comprising forming code words by a predetermined equal number of code elements, wherein said each code element is represented by plural steps formed by different pulse durations, each of said pulse durations being represented by a predetermined number of periods.

2. The method according to claim 1, further comprising multiplying the steps by using first and second encoding alternating currents of identical frequency which are phase-shifted relative to each other through 90 degrees and which are added for transmission.

3. The method according to claim 1, wherein said encoding alternating current is provided at the same time as a transmission alternating current.

4. A method for higher value step encoding wherein the encoding utilizes the duration of pulses which are marked by an alternating current of identical frequency and which pulses are sent in uninterrupted sequence forming an encoding alternating current, wherein said pulses are distinguished from each other by an amplitude change being performed at zero crossing, said method comprising forming code words by a predetermined equal number of code elements, wherein said each code element is represented by plural steps formed by different pulse durations, each of said pulse durations being represented by a predetermined number of half-periods.

5. The method according to claim 4, further comprising multiplying the steps by using first and second encoding alternating currents of identical frequency which are phase-shifted relative to each other through 90 degrees and which are added for transmission.

6. The method according to claim 4, wherein said encoding alternating current is provided at the same time as a transmission alternating current.

* * * * *